United States Patent
Finnsson et al.

(10) Patent No.: US 11,051,522 B2
(45) Date of Patent: Jul. 6, 2021

(54) CUTTING SYSTEM FOR CUTTING FOOD PRODUCTS

(71) Applicant: MAREL ICELAND EHF, Gardabaer (IS)

(72) Inventors: Thorir Finnsson, Kopavogur (IS); Kristjan Hallvardsson, Reykjavik (IS)

(73) Assignee: MAREL ICELAND EHF, Gardabaer (IS)

( * ) Notice: Subject to any disclaimer, the term of this patent is extended or adjusted under 35 U.S.C. 154(b) by 0 days.

(21) Appl. No.: 16/504,035

(22) Filed: Jul. 5, 2019

(65) Prior Publication Data

US 2019/0327985 A1    Oct. 31, 2019

Related U.S. Application Data

(63) Continuation of application No. 15/319,834, filed as application No. PCT/EP2015/063987 on Jun. 22, 2015, now abandoned.

(30) Foreign Application Priority Data

Jun. 20, 2014   (EP) .................................... 14173237

(51) Int. Cl.
   *A22C 25/16* (2006.01)
   *B26D 7/06* (2006.01)
   (Continued)

(52) U.S. Cl.
   CPC ........ *A22C 25/166* (2013.01); *A22C 17/0086* (2013.01); *B26D 5/005* (2013.01); *B26D 7/01* (2013.01); *B26D 7/0625* (2013.01)

(58) Field of Classification Search
   CPC ........ B26D 5/005; B26D 7/0625; B26D 7/01; B26D 5/007; G05B 19/4183; A23N 15/12;
   (Continued)

(56) References Cited

U.S. PATENT DOCUMENTS

| | | | |
|---|---|---|---|
| 3,302,669 A | 2/1967 | Edler | |
| 5,042,339 A * | 8/1991 | Gerber ...................... | B26F 1/38 83/49 |

(Continued)

FOREIGN PATENT DOCUMENTS

| | | |
|---|---|---|
| WO | 2006064521 A1 | 6/2006 |
| WO | 2011095998 A1 | 8/2011 |
| WO | 2013132068 A1 | 9/2013 |

OTHER PUBLICATIONS

Extended European Search Report for Corresponding European Application No. 14173237.0, dated Oct. 16, 2014.
(Continued)

*Primary Examiner* — Ghassem Alie
(74) *Attorney, Agent, or Firm* — Workman Nydegger (57) ABSTRACT

This invention relates to a cutting system for cutting food products while the food products are conveyed by a conveyor. An arc-shaped system and a cutting means are provided, where the cutting means is adapted to be connected to the arc-shaped system. The arc-shaped system is adapted to be positioned above a surface area of the conveyor on which said food products are resting during the cutting such that the center of the arc-shaped system is around the surface area. A control unit operates the position of the cutting means within the arc-shaped system based on image data.

18 Claims, 7 Drawing Sheets

(51) Int. Cl.
 *B26D 5/00* (2006.01)
 *A22C 17/00* (2006.01)
 *B26D 7/01* (2006.01)

(58) Field of Classification Search
 CPC .... A23N 15/04; A23N 15/003; Y10T 83/364; Y10T 83/141; A22C 25/00; A22C 17/0086; A22C 25/166; B26F 3/004; B26F 3/932
 USPC ...... 83/34, 36, 72, 177, 53, 423, 471.3, 932, 83/486.1; 99/635, 645; 429/231
 See application file for complete search history.

(56) References Cited

U.S. PATENT DOCUMENTS

| | | | |
|---|---|---|---|
| 5,071,503 A | 12/1991 | Berman | |
| 5,367,929 A | 11/1994 | Burch et al. | |
| 5,793,015 A | 8/1998 | Walczyk | |
| 7,593,785 B2 | 9/2009 | Blaine et al. | |
| 7,886,784 B2 | 2/2011 | McFadden | |
| 2005/0032471 A1* | 2/2005 | Pfarr | B23K 26/0838 452/181 |
| 2008/0289466 A1 | 11/2008 | Takama et al. | |
| 2011/0293797 A1 | 12/2011 | Pryor et al. | |
| 2014/0220193 A1* | 8/2014 | Hocker | A22C 17/008 426/231 |

OTHER PUBLICATIONS

International Search Report for corresponding International PCT Application No. PCT/EP2015/063987, dated Sep. 15, 2015.

\* cited by examiner

CUTTING SYSTEM FOR CUTTING FOOD PRODUCTS

FIELD OF THE INVENTION

The present invention relates to a cutting system for cutting food products while the food products are conveyed by a conveyor means, and to a food processing system and a method of processing food products while the food products are conveyed by a conveyor means using such a cutting system.

BACKGROUND OF THE INVENTION

Processing food products such as fish fillet has in the past often been a manual operation. In the recent years, companies have been moving towards more and more automation with the aim of saving labour costs.

Figure 1A:
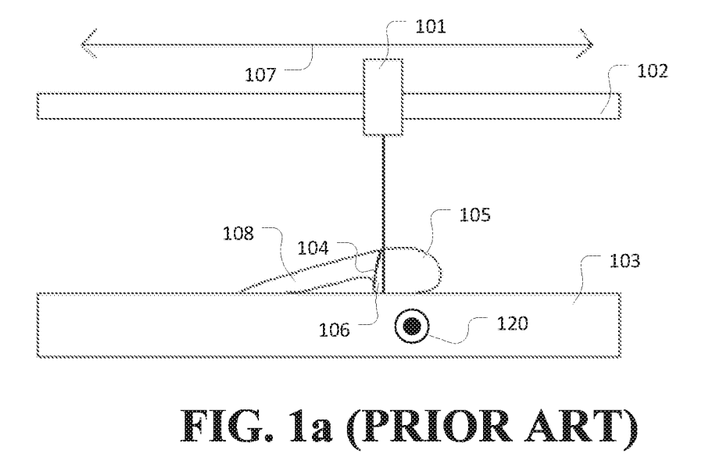
FIGS. 1a-1b depicts graphically cross sectional view of a prior art cutting system.

FIG. 1a depicts graphically a cross sectional view of a prior art cutting system that is capable of processing food product automatically based on image data. In this example, the food product is a cod fillet that is processed while being conveyed by a conveyor 103 in a conveying direction 120. Image data such as X-ray data is used as a control parameter in operating a cutting device 101, which can be a high pressure water jet, that is slideable mounted to a track 102 by means of controlling the back and forth movement of the cutting device 101 within the track 102 as indicated by the arrow 107. In this example, the aim is to cut around the pin bones 104 in the fish fillet so as to automatically separate the loin 105 (which is the most valuable part) and the belly flap 108 from the pin bones. An example of such a system is disclosed in WO2011/095998.

The fact that the pin bones form an angle in relation to the vertical cutting angle and therefore valuable part of the loin, namely within area 106, will constitute as a waste with the pin bones and thus the efficiency of the processing will be less.

WO2011/095998 further discloses that three dimensional X-ray data may be processed for determining an angle of the tough tissues in the food products and where the angle of the tough tissues may be used to determine a cutting angle which is used as a tuning parameter for adjusting the angle of a high pressure water jet nozzle system (or cutting blade) when cutting the tough tissues from the food products. This angle adjustment is performed using a robot with 6 degrees of freedom, where the pivot point is above the food product, i.e. at the height level of the water jet nozzle system.

However, a small inaccuracy in a pivot point of the water jet nozzle magnifies the inaccuracy in the actual angular cut in the food product being processed, e.g. around pin bones in a fish fillet, and thus reduces the throughput of the processing since some meat may follow with the tough tissues being cut away from the food product.

Also, using such a robotic arm limits the capacity greatly due to the slow motion of the robot due to its large weight. In order to overcome this problem the conveying speed of the food product being processed must be slowed down, or the number of robotic arms must be increased. Both these possibilities are obviously non favourable since in the former case the capacity will be reduced whereas in the latter case the system becomes too costly and spacious.

Figure 1B:
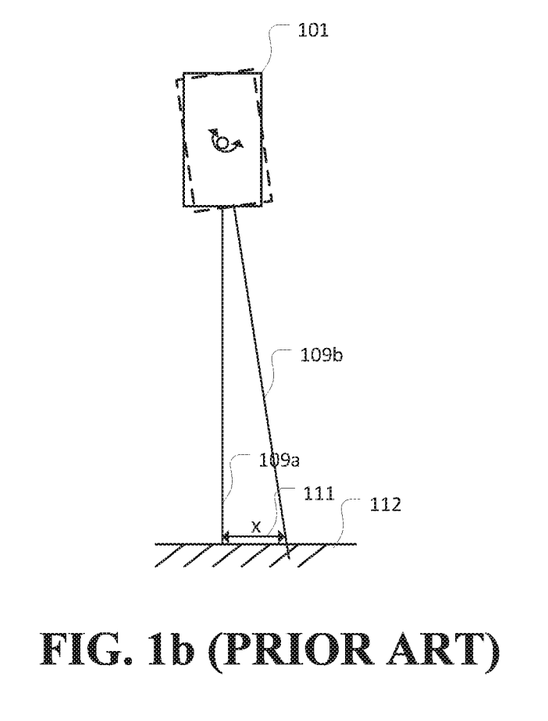

A scenario indicating how small inaccuracy in a pivot point is magnified in the angular cut of the food product is shown in FIG. 1b where e.g. the cutting device 101 in figure 1a is pointed in a downward position (solid line) where e.g. the high pressurized water beam 109a forms a 90° angle at the surface 112, and where a small change in the pivot point (dotted line) causes an angle adjustment in the water beam 109b, and which results in a distance x 111 from the target position. This inaccuracy increases with an increasing distance between the cutting device 101 and the surface.

There is thus a need for an food processing system where e.g. the efficiency may be improved by taking into account the angular position of the undersided object such as pin-bones.

SUMMARY OF THE INVENTION

On the above background it is an object of embodiments of the present invention to provide an economical system that is capable of performing inclined cuts in food objects such as fish fillet, poultry meat, beef etc. with high accuracy and where the throughput of the food processing is enhanced.

Embodiments of the invention preferably seek to mitigate, alleviate or eliminate the above mentioned disadvantages singly or in any combination. In particular, it may be seen as an object of embodiments of the present invention to provide a food processing system that solves the above mentioned problems, or other problems, of the prior art.

To address one or more of these concerns, in a first aspect of the invention a cutting system is provided for cutting food products while the food products are conveyed by a conveyor means, comprising:

an arc-shaped system,
a cutting means adapted to be connected to said arc-shaped system, said arc-shaped system being adapted to be positioned above the conveyor surface on which said food products are resting during said cutting such that the center of said arc-shaped system is substantially at or around said conveyor surface, and
a control unit for operating the position of said cutting means within said arc-shaped system based on image data.

Accordingly, a cutting system is provided that is capable of performing cuts on food products under an angle and thus it is possible to e.g. adapt the cut based on the orientation of an undesired object within the food products, e.g. bones in fish fillet, and/or it may be preferred to cut the food products under a certain angle so as to improve the appearance of the food products so that the cut food products look more natural.

More importantly, due to the internal arrangement between the arc-shaped system and the surface on which the food products are resting, e.g. the conveyor belt of the conveyor, the pivot point is the same or substantially the same as the center point of the arc-shaped system. It is thus possible to make a very precise angle adjustment such that it fits accurately to angles of e.g. undesired objects to be removed, e.g. fish bones, or to customer's requirements.

The conveyor means may be similar to the one disclosed in WO2013132068, hereby incorporated in its entirety by reference, where as an example a single conveyor belt is provided comprising three rollers, two adjacent and below the conveyor belt and the third one positioned between and below the two rollers, and where the single belt is bypassed via said rollers so as to create an opening across the conveyor belt, and where the cutting means is positioned directly above the gap at all times with the cutting plane intersecting with the gap at all times, and where the rollers and thus the gap along with the cutting means are moveable in a back and forth movement parallel to the conveying direction.

As disclosed in WO2013132068, such a gap may also be created by utilizing two conveyors placed adjacent to each other such that one end of one of the conveyor and another end of another conveyor are close together and preferably are moveable in such a back and forth movement while maintaining the gap fixed with the cutting means following this movement such that the cutting plane is within the gap at all times.

In one embodiment, said arc-shaped system is adapted to be positioned substantially perpendicular to the conveying direction of said food product such that the movement of the cutting means within the arc-shaped system is substantially perpendicular to the conveying direction of the food products.

In one embodiment, said arc-shaped system further comprises a moving mechanism connected to said arc-shaped system for moving said arc-shaped system across said conveyor and perpendicular to the conveying direction of said food products, where said image data is further utilized in operating the position of said arc-shaped system during cutting. It is therefore possible to adjust the position of said arc-shaped system across the conveyor means and thus it is possible to adjust the cutting process to different positions of the cuts across the conveyor means, e.g. so as to allow inclined cuts along opposite sides of the food objects, or to adjust the cutting process to different positions of the undesired objects across the conveyor means. A flexible cutting system is thus provided having two degrees of freedom movement, i.e. across the conveyor means and within said arc-shaped system.

In one embodiment, wherein said moving mechanism comprises a first timing belt attached to the cutting means and driven by a first motor unit whereby the position of said cutting means within said arc-shaped system is adjusted via said first timing belt by means of exerting with a pulling force onto the cutting means causing a back and forth movement of the cutting means along the arc-shaped system, i.e. in either direction across the arc-shaped system causing a tilting of the cutting means.

In one embodiment, the first timing belt extends between at least two rollers positioned on opposite sides of the conveyor means where at least one of the at least two rollers may be a driving roller driven by the first motor unit that may be positioned sidewise to the conveyor. The first timing belt may have a rotation axis being perpendicular to the conveying direction or any other suitable rotation axis, e.g. in parallel with the conveying direction or angles therebetween. The opposite ends of the first timing belt may be mounted to the cutting means, or the first timing belt may be an endless belt that is mounted to the cutting means.

In one embodiment, said moving mechanism comprises a second timing belt that may be positioned above or below said first timing belt attached to the arc-shaped system and driven by a second motor unit, whereby the position of said arc-shaped system within said cutting system is adjusted via said second timing belt by means of exerting with a pulling force onto the arc-shaped system causing a back and forth movement of the arc-shaped system across the conveyor means. In order to maintain the angular position of the cutting means within the arc-shaped system, while the cutting means is moved sideward across the conveyor means, this may be done by simultaneously adjusting the first timing belt and the second timing belt. It will be understood that it is possible to achieve desired combinations of cutting angle and position by adjusting the first timing belt and the second timing belt simultaneously.

In one embodiment, the second timing belt extends between at least two rollers positioned on opposite sides of the conveyor means where at least one of the at least two rollers may be a driving roller driven by the second motor unit that may be positioned sidewise to the conveyor, and where the second timing belt may be positioned above or below the first timing belt. The rotation axis of the second timing belt may be perpendicular to the conveying direction or may have any other suitable rotation axis, e.g. in parallel with the conveying direction or angles therebetween, similar as said first timing belt. The opposite ends of the second timing belt may be mounted to the arc-shaped system, or the second timing belt may be an endless belt that is mounted to the arc-shaped system.

It is thus possible to have the motor unit(s) and other components positioned away, in this case sideways, from the food products, which is highly favorable within the food industry due to hygiene.

Moreover, the fact that the pivot point is the same or substantially the same as the center point of the arc-shaped system such that a small inaccuracy will not be transferred to the accuracy in the actual cut. It is thus acceptable to use such timing belts, which are typically made of flexible material such as rubber, and which allow such a sidewise positioning of the motor unit(s) since slight inaccuracy in the belt length caused by e.g. elasticity of the belt, will result in insignificant erroneous cutting. The possible erroneous cutting will be insignificant e.g. because it is a linear error, essentially corresponding to the length inaccuracy of the flexible belt, as opposed to an error that would be magnified by a cutting system having a pivot point placed a relatively large distance above the conveyor, as illustrated in FIG. 1b.

Also, by utilizing such timing belts, which typically are low weight made of material having high elasticity, the weight of the cutting system may be greatly reduced and thus the mobility and/or the reaction time of the system is greatly enhanced compared to e.g. if the cutting means is attached to a robotic system and the like. Moreover, due to the reduced weight of the cutting system the stress on individual components of the cutting system is reduced, especially in cases where the cuts to be performed are complex or extend over large area where the cutting system must cover large cutting in a short time.

It is noted that other means than timing belts may be used in connection with the present invention, for example lead screws or similar means, whereby a similar functionality can be achieved. Thus, it will be understood that such means may be applied in connection with the embodiments disclosed herein. Hence, one or more of the timing belts as comprised in the appended claims can in accordance with the present invention be replaced by one or more lead screws in modified embodiments of the invention. Also, it will be understood that such modified embodiments may comprise use of one or more timing belts in combination with one or more lead screws.

In one embodiment, said cutting means is selected from:
a fluid pressure cutter,
a laser beam cutter,
a high frequency cutting blade, and
a circular cutting blade.

In one embodiment, said arc-shaped system comprises a first and a second adjacent arc-shaped sliding guides, both having the same or substantially the same center point. In one embodiment, said cutting system further comprises a frame structure comprising at least one first wheel adapted to be slidable attached to said first arc-shaped sliding guide and at least one second wheel adapted to be slidable attached to said second arc-shaped sliding guide, and wherein said cutting means is mounted to said frame structure. Thus, by having two such sliding guides it is ensured that said frame structure is properly secured to said sliding guides and can move smoothly across said sliding guides. The number of sliding guides should not be construed to be limited to only two sliding guides, by a single sliding guide or three or more sliding guides may just as well be implemented.

In one embodiment the cutting system may comprise said first and/or said second motor unit(s) being positioned in fixed position(s) and where said cutting system is configured for being moved back and forth in the conveying direction for the food products, i.e. corresponding to the position of an opening in the conveyor means. The first and/or the second motor unit(s) may be connected to the cutting means and/or the arc-system via timing belts.

In a second aspect of the invention a food processing system is provided for processing food products while the food products are conveyed by a conveyor means, comprising:
- an imaging system for imaging and producing image data of a food product to be processed,
- a cutting system,
- wherein said cutting system comprises:
  - an arc-shaped system,
  - a cutting means adapted to be connected to said arc-shaped system, said arc-shaped system being adapted to be positioned above a surface area of said conveyor means on which said food products are resting during said cutting such that the center of said arc-shaped system is substantially at or around said surface area, and
  - a control unit for operating the position of said cutting means within said arc-shaped system.

Accordingly, a fully automatized food processing system is provided where no manual labour is required and where highly precise cut is provided based on said image data, but the cut may be to facilitate the appearance of the food products to be cut such that they appear more natural, or e.g. the cut may be around undersized objects such as fish bones that lie askew within the fish fillet. As already addressed, arc-shaped system may be attached to a moving mechanism for moving said arc-shaped system across said conveyor and perpendicular to the conveying direction of said food products, where said image data is further utilized in operating the position of said arc-shaped system, and such that the cutting plane of said cutting means approximately intersects with the center of said arc. Thus, a highly accurate angled cut is possible where e.g. cuts around bones in fish, e.g. a cod fillet, may be greatly enhanced where only a minimal amount of loin of the cod is being cut with the pin bones. Said food processing system should of course not be limited to processing only fish fillets, but all types of food products is possible, e.g. poultry breast, lamb meat, pork meat, beef etc.

In one embodiment, said food processing system further comprises a tracking mechanism for tracking said food product at all times and for providing position related data, where said control unit is further adapted to utilize said position related data for controlling the starting and stopping of said cutting means. The tracking mechanism may e.g. be based on utilizing the speed of the conveyor in estimating where the food products are at all times, but other type of tracking mechanism that is well known for person skilled in the art.

In one embodiment, said imaging system is selected from:
- a X-ray system and where said image data are X-ray related data,
- 2D or 3D imaging system,
- color vision system, or
- a combination of one or more of the above.

In a third aspect of the invention a method is provided of processing food products while the food products are conveyed by a conveyor means using a cutting system, where the cutting system comprises:
- an arc-shaped system,
- a cutting means adapted to be connected to said arc-shaped system, said arc-shaped system being adapted to be positioned above a surface area of said conveyor means on which said food products are resting during said cutting such that the center of said arc-shaped system is substantially at or around said surface area, and
- a control unit for operating the position of said cutting means within said arc-shaped system, wherein the method comprises:
- providing image data of a food product to be processed, and
- utilizing the image data for operating the position of said cutting means within said arc-shaped system while cutting said food product.

In one embodiment, said image data include data indicating the position of undesired objects within said food product, and wherein the step of utilizing the image data in operating said cutting device while cutting said food product includes cutting around said undesired objects. The food object may in one embodiment be, but is not limited to, a fish fillet and where said undesired objects include bones in the fish fillet In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 2:
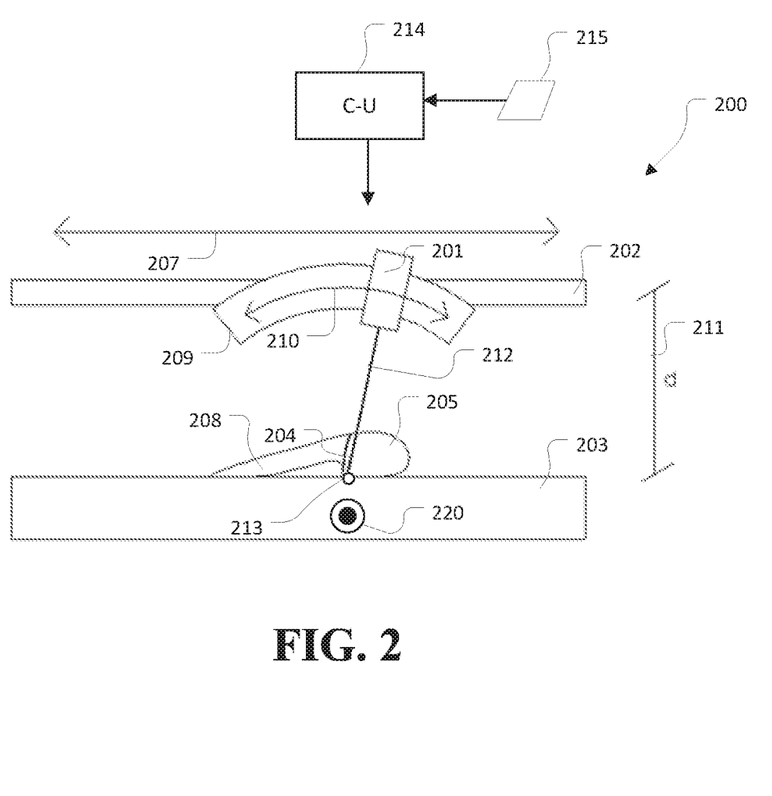
FIG. 2 illustrates graphically a cross sectional view of a cutting system according to the present invention.

FIG. 2 illustrates graphically a cross sectional view of a cutting system 200 according to the present invention for cutting food products while the food products are conveyed in a conveying direction 220 (either in or out of the page) by a conveyor means 203.

For illustration purposes in the following it is assumed that the food product to be processed is fish fillet, e.g. a cod, and where the aim is to cut around the pinbones 204 in the fish fillet so as to separate the loin 205 and the belly flap 208 from the pin bones. The food products should of course not be limited to fish fillet but the food products may also include poultry meat, pork, beef etc.

The cutting system 200 comprises an arc-shaped system 209 arranged perpendicular to the conveying direction 220 of the fish fillet and a cutting means 201 that is connected to the arc-shaped system 209. The cutting means may as an example include a fluid pressure cutter that is preferably arranged within the arc-shaped system 209 such that the water stream 212 is perpendicular to the arc-shaped system 209 and points towards the center point of the arc-shaped system 209.

As will be discussed in more details later, the cutting means may be slideable connected to the arc-shaped system 209 so as to allow movement along the arc-shaped system 209 as indicated by the arrow 210. As shown here, the inclined position of the pin bones 204 requires that the cut has an angle which is substantially the same as angle of the pin bones so as to maximize the efficiency of the cut by means of following the angle of the pin bones as much as possible, but the loin 205 is the most valuable part of the fish fillet.

The distance d 211 between the arc-shaped system 209 and the surface on which the fish fillet is resting, i.e. the conveyor 203, is such that the pivot point 213 is the same as the center point of the arc, i.e. at or around the conveyor belt surface. Due to this internal arrangement the accuracy in the angle adjustment is greatly enhanced compared with if e.g. the pivot point would be at the position where the cutting means is positioned.

In one embodiment the cutting system 200 further comprises a moving mechanism 202, which may comprise a straight sliding guide or rail or the like, operable connected to the arc-shaped system 209 for moving the arc-shaped system across the conveyor 203 and perpendicular to the conveying direction of the fish fillet as indicated by the arrow 207. This is to ensure the cutting means is positioned at the correct position across the conveyor 203, e.g. as shown here, before the angled cut is initiated.

In one embodiment the cutting system 200 further comprises a control unit (C_U) 214 that controls both the linear position of the arc-shaped system 209 along the sliding guide 202 and the position of the cutting means 201 within the arc-shaped system 209 based on input data 215, which as will be discussed in more details later may be any type of image data such as X-ray data.

Figure 3:
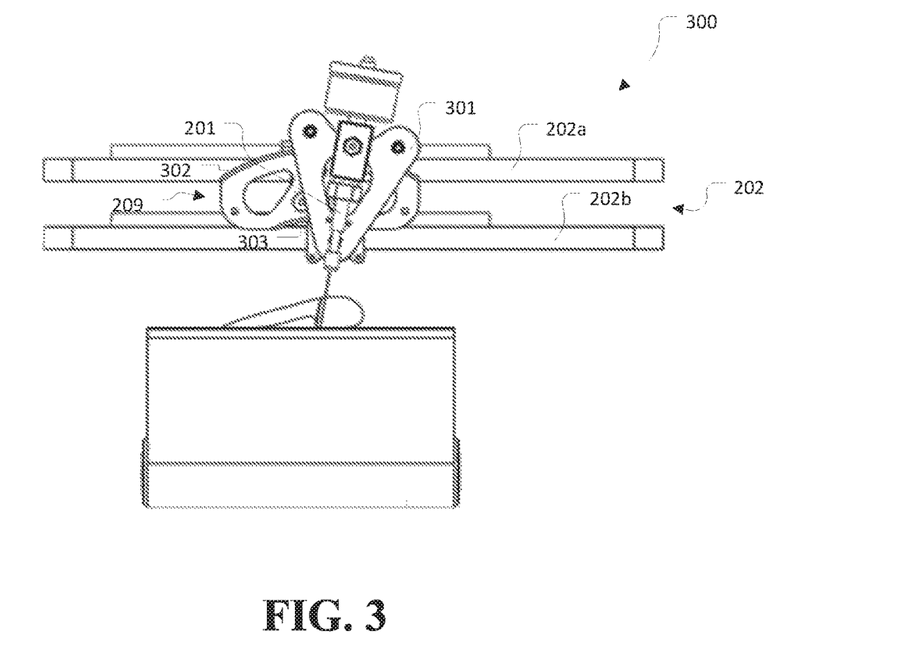
FIGS. 3 and 4 show an embodiment of a cutting system according to the present invention.

FIG. 3 shows an embodiment of a cutting system 300 according to the present invention, wherein the arc-shaped system 209 comprises a first and a second adjacent arc-shaped sliding guides 302, 303 having the same or substantially the same center point. In this embodiment a frame structure 301 is provided comprising at least one first wheel (not shown) slidable attached to the first arc-shaped sliding guide 302 and at least one second wheel slidable attached to the second arc-shaped sliding guide 303, and where the cutting means 201 is mounted to the frame structure 301.

The cutting means may in one embodiment also be attached directly to the arc-shaped system (or the sliding guides), i.e. not via the frame structure 301.

The moving mechanism 202 comprises in this embodiment two parallel sliding guides 202a, 202b and where the arc-shaped sliding guides 302, 303 may be slideable mounted to the sliding guides 202a, 202b.

Figure 4:
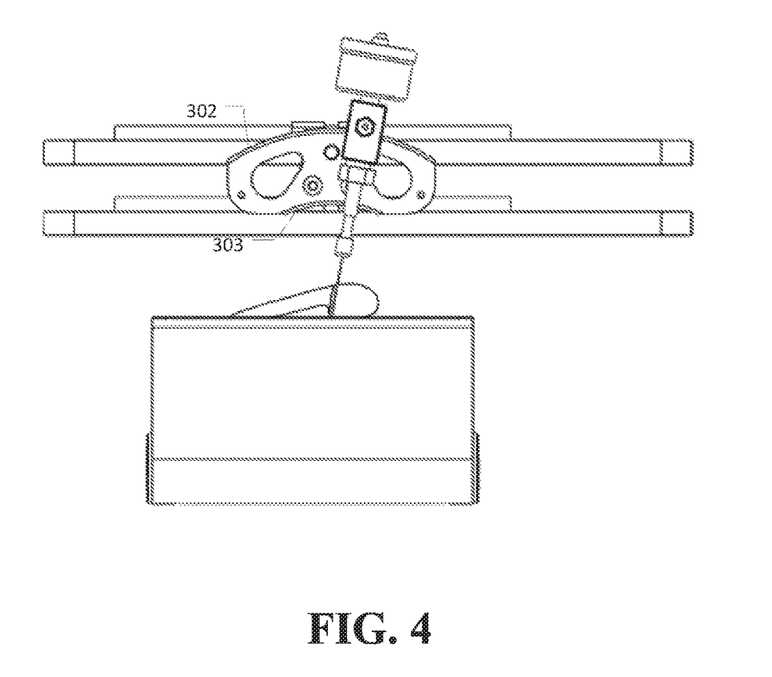

FIG. 4 shows the embodiment of FIG. 3, but in the absence of the frame structure 301 for showing for further clarification the two arc-shaped sliding guides 302, 303, which share a common center point.

FIGS. 5-10 shows an embodiment of a cutting system 600 according to the present invention, where in this embodiment the moving mechanism 602 comprises a first timing belt 630 attached to the cutting means 601 and driven by a first motor unit 633. The position of the cutting means 601 within the arc-shaped system 609 is adjusted via the first timing belt by means of exerting with a pulling force onto the cutting means 601 causing a back and forth movement of the cutting means along the arc-shaped system, i.e. in either direction across the arc-shaped system.

Figure 5:
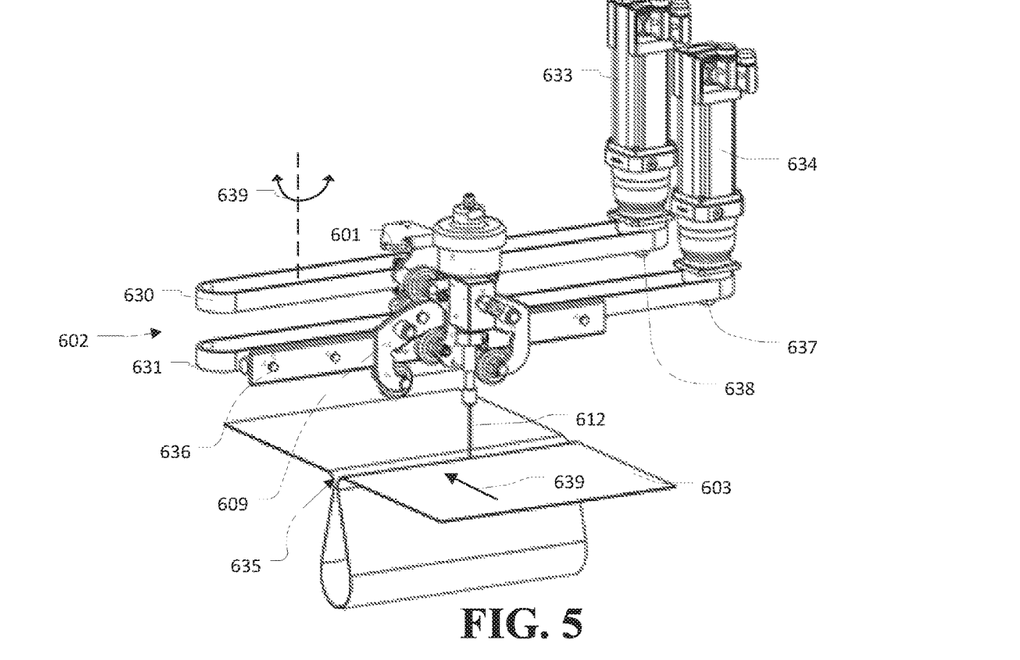
FIGS. 5-10 show an embodiment of a cutting system according to the present invention.

The conveyor system (not shown) may comprise a closed loop conveyor belt 603 similarly as shown in WO2013132068 in FIGS. 2, 4, 5. 7, 10-15 and pages 141. 13-p. 21 1. 5, hereby incorporated by reference, where the conveyor belt 603 extends between three rollers (not shown here), two adjacent and below the conveyor belt and the third one positioned between and below the two rollers, and where the single belt is bypassed via said rollers so as to create an opening 635 across the conveyor belt 603. The cutting means 601 is positioned directly above the gap 635 at all times with the cutting plane intersecting with the gap at all times, and where the rollers and thus the gap along with the cutting means are moveable in a back and forth movement parallel to the conveying direction as indicated by arrow 640.

The first timing belt 630 may extend between two rollers positioned on opposite sides of the conveyor belt 603 where one of the two rollers may be a driving roller 638 driven by the first motor unit 633 positioned sidewise to the conveyor means and an idle roller (not shown). The rotation axis of the first timing belt, as indicated by arrow 639 may be perpendicular to the conveying direction 640. The opposite ends of the first timing belt may be mounted to the cutting means, or the first timing belt may be an endless belt that is mounted to the cutting means.

In one embodiment, the moving mechanism further comprises a second timing belt 631 that as shown here is positioned below the first timing belt (may just as well be positioned above) having the same rotation axis 639 attached to the arc-shaped system and driven by a second motor unit 634, where the position of the arc-shaped system 609 within said arc-shaped system is adjusted via said second timing belt by means of exerting with a pulling force onto the arc-shaped system causing a back and forth movement of the arc-shaped system across the conveyor means. Since the cutting means is slideable mounted to the arc-shaped system the cutting means will follow the movement of the arc-shaped system. In order to maintain or adjust the angular position of the cutting means within the arc-shaped system, this may be done by simultaneously adjusting the cutting means via the first timing belt. It will be understood that it is possible to achieve desired combinations of cutting angle and position by adjusting via the first timing belt and the second timing belt simultaneously.

In one embodiment, the second timing belt 631 extends between at least two rollers positioned on opposite sides of the conveyor means where at least one of the at least two rollers may be a driving roller driven by the second motor unit 634 that may be positioned sidewise to the conveyor, and where the second timing has a rotation axis being perpendicular to the conveying direction, similar as the first timing belt 630. The opposite ends of the second timing belt may be mounted to the arc-shaped system 609, or the second timing belt may be an endless belt that is mounted to the arc-shaped system. It is thus possible to have the motor unit(s) and other components positioned away, in this case sideways, from the food products, which is highly favorable within the food industry due to hygiene.

Figure 6:
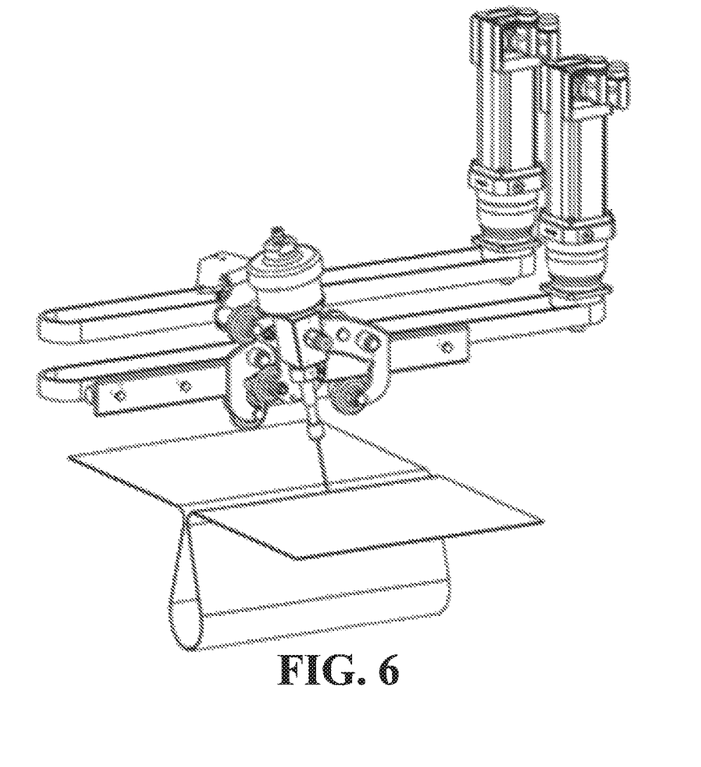
Figure 7:
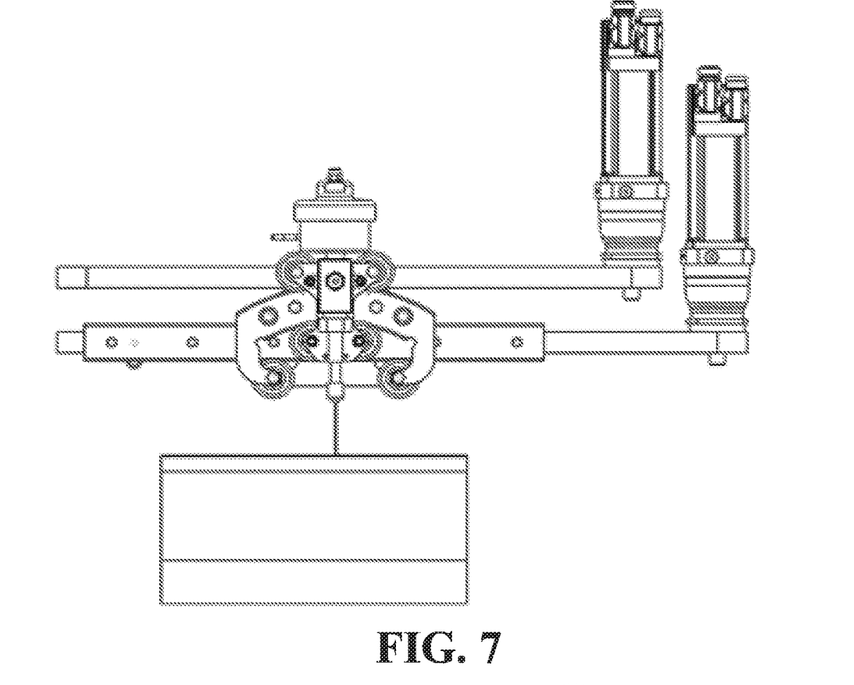
Figure 8:
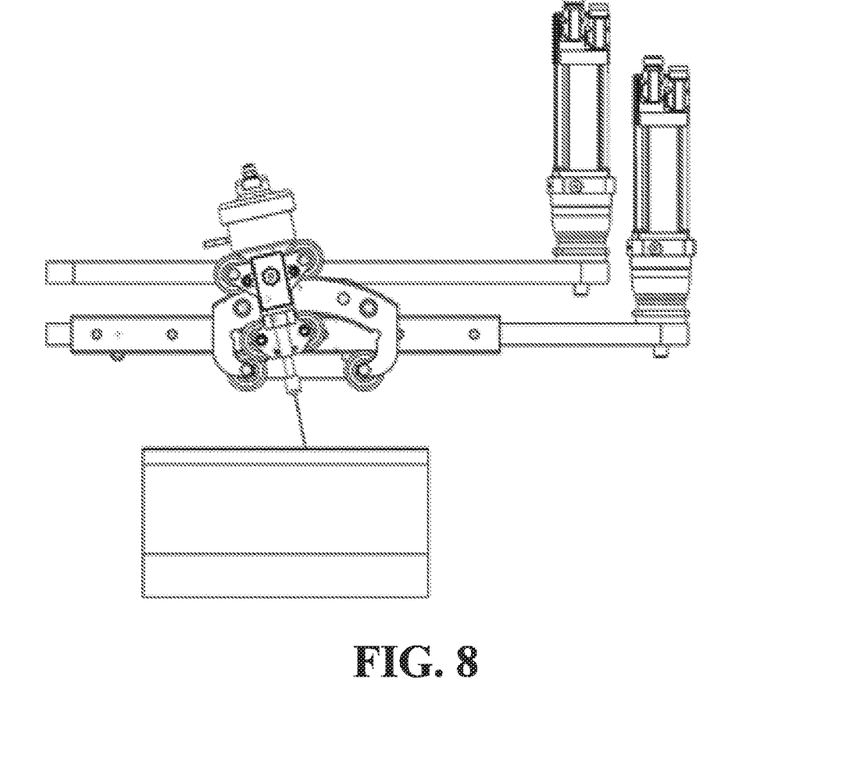
Figure 9:
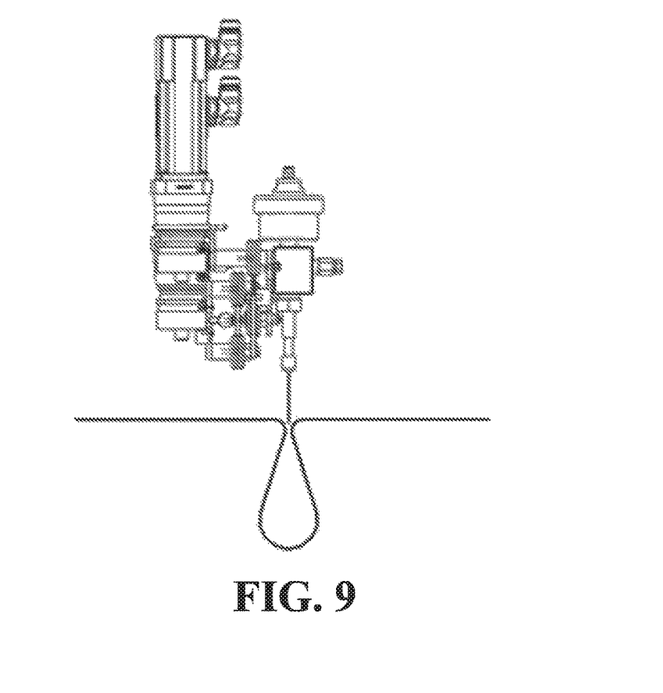
Figure 10:
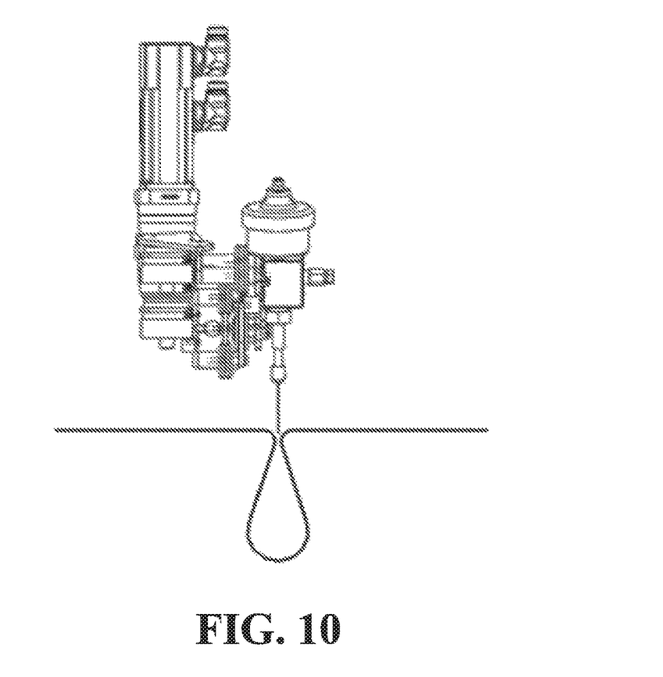

FIGS. 6 shows the cutting system 600 where the angular adjustment of the cutting means 601 has been adjusted, FIGS. 7 and 8 show a front view and FIGS. 9 and 10 shows a side of the cutting system 600 in FIGS. 6 and 7.

Figure 11:
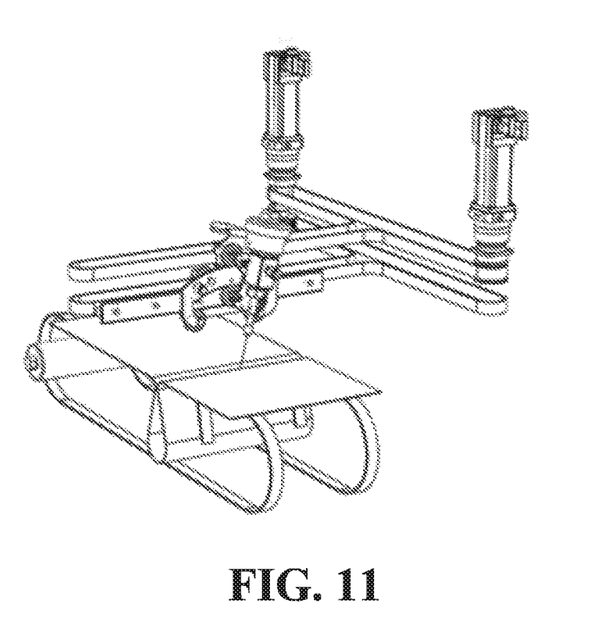
FIG. 11 shows an embodiment of a cutting system according to the present invention.

FIG. 11 shows an embodiment of a cutting system according to the present invention, where in this embodiment the moving mechanism comprises a first timing belt and a second timing belt being driven by a first motor unit and a second motor unit, respectively, in a manner as essentially explained in connection with FIGS. 5-10. Thus, the position of the cutting means within the arc-shaped system may be adjusted by the first motor unit and the position of the arc-shaped system across the conveyor means may be adjusted by the second motor unit, whereby the angle of the cutting means and the position across the conveyor means are adjustable as previously discussed. The first timing belt and the second timing belt may be placed one above the other as described above in connection with FIGS. 5-10 and may be extending between rollers, one of which being a driving roller for each timing belt driven by the respective motor units. However, in this embodiment the timing belts are essentially arranged in T-shaped loops as indicated in FIG. 11, which requires e.g. that a number of idle rollers are employed in order to guide the timing belts, including for example an idle roller for each timing belt placed on the same axis as the driving roller for each motor unit. Further, the first and the second motor units are placed in fixed positions, whereas the cutting system and the moving mechanism together with the opening in the conveyor belt and e.g. the rollers associated with this opening can be moved in the conveying direction of the conveyor belt, i.e. in either direction back and forth in the conveying direction. Thus, it will be understood that when this cutting system is moved back and forth together with the opening in the conveyor belt, e.g. driven by a further motor unit (not shown), the first motor unit and a second motor unit will have to be controlled correspondingly, if the angle and the position across the conveyor of the cutting system are to be maintained. Or put in other words, these three motor units will have to be controlled in dependence on each other in order to achieve a desired cutting pattern. It will be understood that the embodiment disclosed in FIG. 11 necessitates even longer flexible belts to be used than in the embodiment disclosed in FIGS. 5-10, which may increase the inaccuracy, but which on the other hand has the advantage that e.g. the relatively heavy motor units need not be moved together with the cutting system. It is noted that embodiments of a cutting system according to the present invention, essentially as described above with reference to FIG. 11, may comprise only one of the disclosed adjustment systems, e.g. the first motor, which via the first timing belt can perform an adjustment of the position of the cutting means within the arc-shaped system, or the second motor, which via the second timing belt can perform an adjustment of the position of the arc-shaped system in the cutting system, and where the first or the second motor unit is placed in a fixed position, while the cutting system can be moved together with the opening in the conveyor belt, i.e. in either direction back and forth in the conveying direction.

Figure 12:
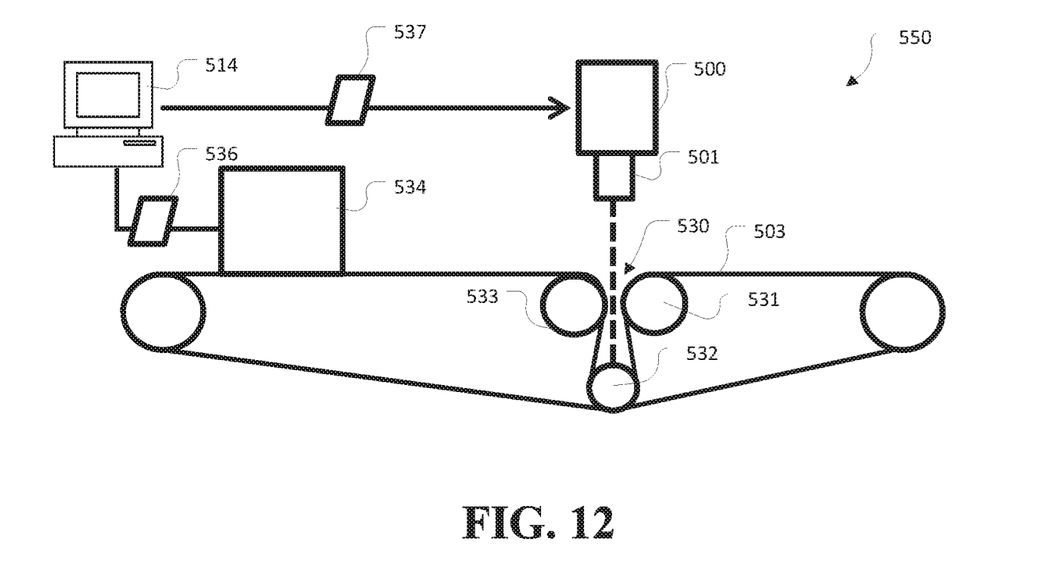
FIG. 12 shows an embodiment of a food processing system according to the present invention.

FIG. 12 shows an embodiment of a food processing system 550 according to the present invention for processing food products while the food products are conveyed by a conveyor means 503. The food processing system 500 comprises an imaging system 534 and a cutting system 500 according to the present invention comprising the arc-shaped system discussed in relation to FIGS. 2-4 (not shown), a cutting means 501 and a control unit 514 which may be any type of a computer or industrial computer system.

The conveyor means may, as discussed previously, be similar to the one disclosed in WO2013132068, hereby incorporated in its entirety by reference. As shown, in this embodiment the conveyor means comprises a single conveyor belt that is bypassed via rollers 531-533 or the like for creating a gap 530, and where the cutting means is positioned directly above the gap at all times with the cutting plane intersecting with the gap 530. Preferably, the rollers 531-533 are connected together and are moveable back and forth and where the cutting means 501 follows the back and forth movement of the rollers. Such a gap 530 may also be created by utilizing two conveyors placed adjacent to each other such that one end of one conveyor and another end of another conveyor are close together and preferably are moveable in such a back and forth movement while maintaining the gap fixed.

The imaging system 534 may in one embodiment be an X-ray device that outputs X-ray data 536 which may be processed by the computer system 514, where the computer system 514 outputs operation parameters 537 for operating the cutting, e.g. the back and forth movement of the cutting means within the arc-shaped system and the linear movement of the arc-shaped system as discussed in relation to FIGS. 2 and 3.

The food processing system shown here may also comprise a tracking mechanism for tracking said food product at all times and for providing position related data, where the control unit or the computer system 514 is further adapted to utilize the position related data for controlling the starting and stopping of said cutting means.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of processing food products while the food products are conveyed by a conveyor means using a cutting system, where the cutting system comprises:
    an arc-shaped system including a first arc-shaped sliding guide,
    a cutting device connected to said first arc-shaped sliding guide of the arc-shaped system, said first arc-shaped sliding guide positioned above a conveyor surface on which said food products are resting during said cutting, such that a longitudinal extension of the first arc-shaped sliding guide is perpendicular to a conveying direction of said food product and a center of said first arc-shaped sliding guide is substantially at or around said conveyor surface,
    a control unit for operating a position of said cutting device within said arc-shaped system based on image data of a food product to be processed, the image data being received by the control unit, and a moving mechanism connected to said arc-shaped system that moves the arc-shaped system across said conveyor in a back and forth movement along a straight line perpendicular to the conveying direction of said food products, wherein the method comprises:

providing image data of a food product to be processed, and utilizing the image data for operating the position of said cutting device within said arc-shaped system while cutting said food product;

wherein said image data is further utilized in operating the position of said arc-shaped system during cutting to control the position of said cutting device;

wherein the cutting device points towards said center at all positions along the first arc-shaped sliding guide.

2. The method according to claim 1, wherein said image data include data indicating the position of undesired objects within said food product, and wherein the step of utilizing the image data in operating said cutting device while cutting said food product includes cutting around said undesired objects by moving the cutting device in two degrees of freedom including along the first arc-shaped sliding guide and across the conveyor means.

3. The method according to claim 2, wherein the food product is a fish fillet and where said undesired objects include bones in the fish fillet.

4. A cutting system for cutting food products while the food products are conveyed by a conveyor means, the cutting system comprising:

an arc-shaped system including a first arc-shaped sliding guide, a cutting device slidably connected to said first arc-shaped sliding guide of the arc-shaped system, said first arc-shaped sliding guide positioned above a conveyor surface on which said food products are resting during said cutting, such that a longitudinal extension of the first arc-shaped sliding guide is perpendicular to a conveying direction of said food products and a center of said first arc-shaped sliding guide is substantially at or around said conveyor surface, a control unit for operating a position of said cutting device within said arc-shaped system based on image data of a food product to be processed, the image data being received by the control unit, and a moving mechanism connected to said arc-shaped system that moves the arc-shaped system including the first arc-shaped sliding guide across said conveyor in a back and forth movement along a straight line perpendicular to the conveying direction of said food products;

wherein said image data is further utilized in operating the position of said arc-shaped system during cutting to control the position of said cutting device;

wherein the cutting device is arranged on the first arc-shaped sliding guide within said arc-shaped system such that the cutting device moves along a length of the arc-shaped sliding guide such that the cutting device points towards said center at all positions along the first arc-shaped sliding guide.

5. The cutting system according to claim 4, wherein the movement of the cutting device within the arc-shaped system is along the first arc-shaped sliding guide and is substantially perpendicular to the conveying direction of the food products.

6. The cutting system according to claim 4, wherein said moving mechanism comprises a first timing belt attached to the cutting device and driven by a first motor unit such that the position of said cutting device within said arc-shaped system is adjusted via said first timing belt by means of exerting with a pulling force onto the cutting device causing a back and forth movement of the cutting device along the first arc-shaped sliding guide and perpendicular to the conveying direction of said food products.

7. The cutting system according to claim 6, wherein the first timing belt extends between at least two rollers positioned on opposite sides of the conveyor means where at least one of the at least two rollers is a driving roller driven by the first motor unit that is positioned sidewise to the conveyor.

8. The cutting system according to claim 6, wherein said moving mechanism comprises a second timing belt that may be positioned above or below said first timing belt attached to the arc-shaped system and driven by a second motor unit such that the position of said arc-shaped system within said cutting system is adjusted via said second timing belt by means of exerting with a pulling force onto the arc-shaped system causing a back and forth movement of the arc-shaped system across the conveyor means.

9. The cutting system according to claim 8, wherein the second timing belt extends between at least two rollers positioned on opposite site of the conveyor means where at least one of the two rollers is a driving roller driven by the second motor unit that is positioned sidewise to the conveyor.

10. The cutting system according to claim 8, wherein, in order to maintain an angular position of the cutting device within the arc-shaped system during a movement of the first arc-shaped sliding guide perpendicular to the conveying direction, the first timing belt and the second timing belt are driven simultaneously.

11. The cutting system according to claim 4, wherein the arc-shaped system includes a second arc-shaped sliding guide adjacent to the first arc-shaped sliding guide, such that the second arc-shaped sliding guide and the first arc-shaped sliding guide have the same center point and a different arc-shape.

12. The cutting system according to claim 11, wherein the cutting device includes at least one first wheel slidably attached to the first arc-shaped sliding guide and at least one second wheel slidably attached to the second arc-shaped sliding guide for changing the position of the cutting device within the arc-shaped system.

13. The cutting system according to claim 4, wherein the conveyor surface includes a gap below the cutting device, such that a cutting plane of the cutting device is within the gap at all positions along the first arc-shaped sliding guide.

14. The cutting system according to claim 4, wherein the cutting device has no more than two degrees of freedom of movement within the cutting system.

15. A food processing system for processing food products while the food products are conveyed by a conveyor means, the food processing system comprising:

an imaging system for imaging and producing image data of a food product to be processed, a cutting system, wherein said cutting system comprises:

an arc-shaped system including a first arc-shaped sliding guide, a cutting device slidably connected to said first arc-shaped sliding guide of the arc-shaped system, said first arc-shaped sliding guide positioned above a conveyor surface on which said food products are resting during said cutting, such that a longitudinal extension of the first arc-shaped sliding guide is perpendicular to a conveying direction of said food product and a center of said first arc-shaped sliding guide is substantially at or around said conveyor surface, a control unit for operating a position of said cutting device within said arc-shaped system based on said image data of the food product to be processed, the image data being received by the control unit, and wherein said arc-shaped system is attached to a moving mechanism that moves said arc-shaped system across said conveyor in a back and forth movement along a straight line perpendicular to the conveying direction of said food products;

wherein said image data is further utilized in operating the position of said arc-shaped system during cutting to control the position of said cutting device;

wherein the cutting device is arranged on the first arc-shaped sliding guide within said arc-shaped system such that the cutting device moves along a length of the arc-shaped sliding guide such that the cutting device points towards said center at all positions along the first arc-shaped sliding guide.

16. The food processing system according to claim 15, wherein said image data is further utilized in operating the position of said arc-shaped sliding guide during cutting to control the position of said cutting device.

17. The food processing system according to claim 15, further comprising a tracking mechanism for tracking said food product at all times based on said image data and for providing position related data, where said control unit is further adapted to utilize said position related data for controlling the starting and stopping of said cutting device.

18. The food processing system according to claim 15, wherein said imaging system is selected from:
   a X-ray system and where said image data are X-ray related data,
   2D or 3D imaging system,
   color vision system, or
   a combination of one or more of the above.

* * * * *